United States Patent [19]

Holuigue et al.

[11] Patent Number: 4,956,849
[45] Date of Patent: Sep. 11, 1990

[54] PROCESS AND APPARATUS FOR GRAPHITIZING CARBON BODIES

[75] Inventors: Claude Holuigue, Le Fayet, France; Heinrich Panholzer, Linz, Austria; Karl-Wilhelm Maier, Fürth, Fed. Rep. of Germany; Wolfgang Trimmel, Leoben, Austria

[73] Assignee: Voest-Alpine Maschinenbau Gesellschaft m.b.H., Linz, Austria

[21] Appl. No.: 388,256

[22] Filed: Aug. 1, 1989

[30] Foreign Application Priority Data

Aug. 4, 1988 [AT] Austria .................................. 1966/88

[51] Int. Cl.⁵ .............................................. H05B 3/00
[52] U.S. Cl. ................................................... 373/120
[58] Field of Search ............... 373/109, 120, 122, 125, 373/126; 201/17-19; 264/29.5, 29.6

[56] References Cited

U.S. PATENT DOCUMENTS

| | | | |
|---|---|---|---|
| 1,133,259 | 3/1915 | Brown | 373/120 |
| 4,017,673 | 4/1977 | Michels et al. | 373/120 |
| 4,639,929 | 1/1987 | Bernard | 373/120 |
| 4,730,339 | 3/1988 | Corato et al. | 373/120 |

FOREIGN PATENT DOCUMENTS 121530 4/1986 European Pat. Off. .
2316494 10/1974 Fed. Rep. of Germany ...... 373/120

Primary Examiner—Roy N. Envall, Jr.
Attorney, Agent, or Firm—Kurt Kelman

[57] ABSTRACT

For use in the graphiting of carbon bodies, a graphiting furnace is proposed, which contains inert gas and in which carbon bodies forced together to form a train are fed in feeding steps. The train is axially gripped to set up therein an axial compressive stress which is sufficient to render the train self-supporting. That axial compressive stress is also maintained while a graphited carbon body is removed from the train and a carbon body to be graphited is added to the train between consecutive feeding steps.

9 Claims, 2 Drawing Sheets

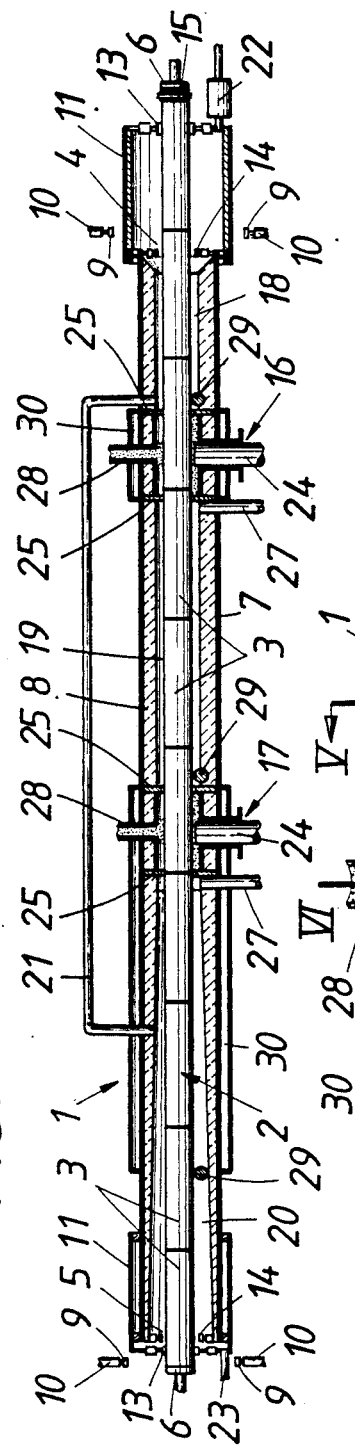
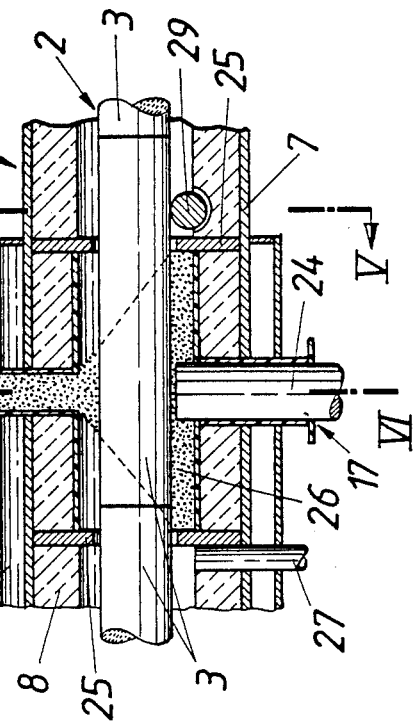

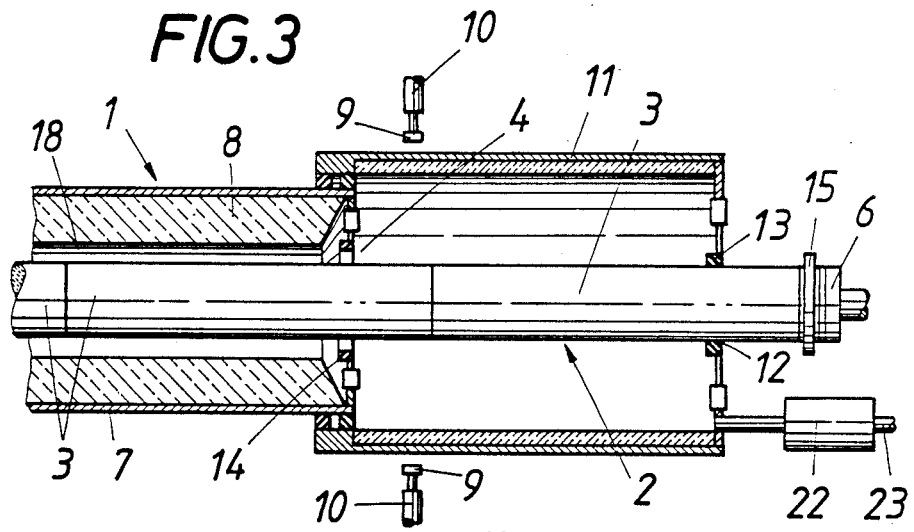
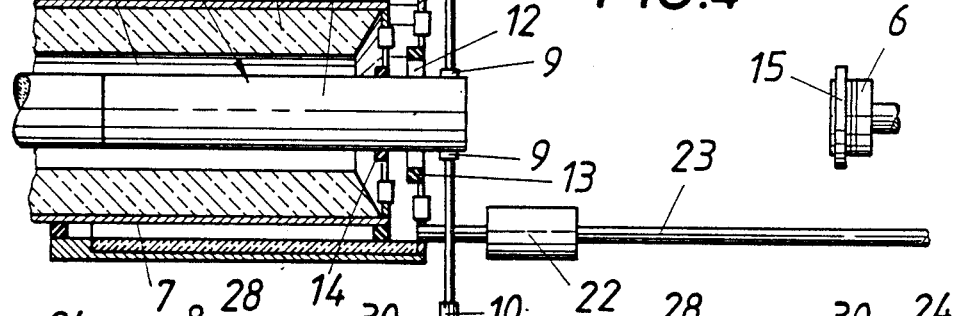
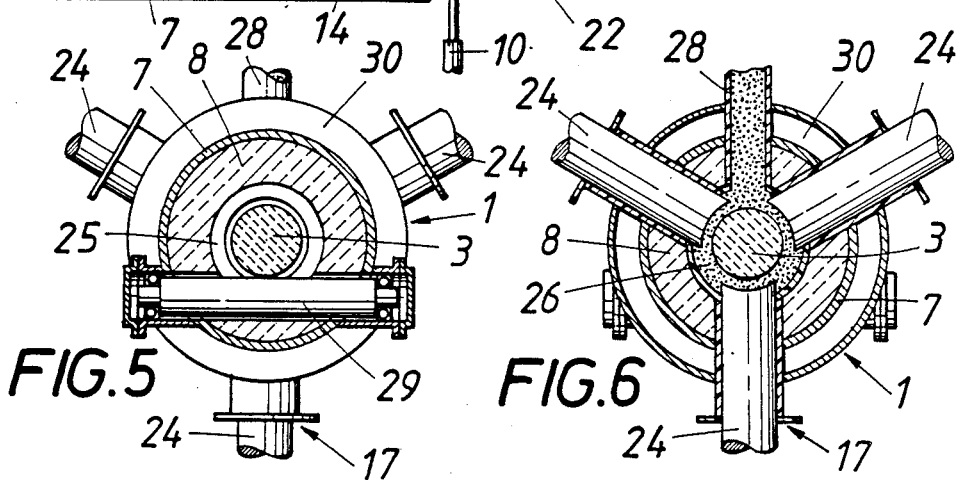

PROCESS AND APPARATUS FOR GRAPHITIZING CARBON BODIES

BACKGROUND OF THE INVENION

1. Field of the Invention

This invention relates to a process of graphitizing carbon bodies which are forced together in end-to-end alignment to form a horizontal train, which is axially conveyed through a graphitizing furnace in feeding steps, which are at least as long as one carbon body, and in said furnace is heated to a graphitizing temperature at least in part of its length by a supply of electric current, between consecutive conveying steps said train is shortened at the exit end of the furnace by the removal of at least one graphitized carbon body and is lengthened at the entrance end of the furnace by the addition of at least one carbon body which is to be graphitized. The invention relates also to an apparatus for carrying out the process.

2. Description of the Prior Art

Preburnt carbon bodies which are to be graphited are forced together in end-to-end alignment to form a train, which is fed into a graphitizing furnace, in which electric current supplied via electrodes applied to the train is caused to flow through the train so that the carbon bodies can be heated to the required graphitizing temperature by the Joule effect. In order to avoid the presence of an oxidizing atmosphere in the graphitizing furnace, the latter is filled either with an inert gas or with carbon particles. A filling with carbon particles will afford the advantage that the train if it is horizontally oriented will be supported by the carbon particles and cannot sag. But a disadvantage resides in that the carbon particles of the packing will be heated with the train so that more energy will be required. As the temperature of the carbon particle increases, their electrical conductivity will also increase so that conducting paths which are parallel to the train may be established in the packing.

The disadvantages involved in the use of a bed of carbon particles will be avoided if said bed is replaced by an inert gas atmosphere in the graphitizing furnace but in that case the carbon bodies of the train will have to be properly supported by additional means because the train is no longer supported by a particulate packing. Because the train is not supported by a bed of particles in a furnace filled with an inert gas atmosphere and it is difficult to supply electric current to a moving train, a continual movement of the train through the graphitizing furnace has only been disclosed in conjunction with graphitizing furnaces containing a packing of carbon particles (EP-B-0 121,530). In that known process the train is moved through the furnace in steps and after each step is shortened at the exit end of the furnace by the removal of a graphitized carbon body and is lengthened at the entrance end of the furnace by the addition of a carbon body which is to be graphitized. As the train is moved, it is gripped between two gripping heads, which are disposed at opposite ends of the furnace, and the train is axially displaced by said gripping haeds to the extent of the length of one carbon body. Thereafter the gripping heads release the train at its end faces so that the train can be shortened and lengthened, respectively. The train may readily be relieved from the axial compressive stress between consecutive feeding steps because the train is supported by the packing of carbon particles and because the electric current is shut off between the consecutive feeding steps so that the carbon bodies need not be forced together for establishing a conductive connection between adjacent carbon bodies. The carbon particles of the packing will ensure a comparatively simple conduction of current between electrodes, which in the furnace extend radially to the train, and the train. Owing to their elevated temperature the carbon particles have an adequate electrical conductivity adjacent to the electrodes so that current may be supplied via terminals which are so distributed over the length of the train that a distinction can be made between a preheating zone, a graphitizing zone and a cooling zone. Heat sinks protruding into the interior of the furnace in the cooling zone may be provided to effect an additional dissipation of heat from the cooling zone. But the disadvantages involved in the use of a packing of carbon particles in the furnace will not be eliminated in such an arrangement. Besides, the desirable support of the train will increase the resistance opposing the feeding movement of the train and the surface of the train may be damaged by the movement of the train in contact with the carbon particles.

SUMARY OF THE INVENTION

It is an object of the invention so to improve a process which is of the kind described first hereinbefore and serves to graphite carbon bodies that the train composed of carbon bodies can continually be graphitized with a comparatively low energy demand wherea a packing of carbon particles is not required in the furnace.

That object is accomplished in accordance with the invention in which the train is moved through the furnace, which is filled with an inert gas, while the train is axially gripped to set up therein an axial compressive stress which is sufficient to render the train self-supporting and axial compressive stress is maintained as the train is shortened and lengthened between consecutive feeding steps.

Because the axial compressive stress which is sufficient to render the train self-supporting is maintained also as a graphitized carbon body is removed from the train at the exit end of the furnace and a carbon body to be graphitized is added to the train at the entrance end of the furnace, the train can continually be fed in steps through the graphitizing furnace although said furnace does not contain a packing of carbon particles. For this reason the furnace may contain an inert gas atmosphere so that the disadvantages involved in the use of a bed of carbon particles will be avoided and the energy demand will be reduced as there is no particulate packing which would also be heated. To render the train self-supporting by an axial gripping of the train the compressive stress which is required for such gripping must be lower than the compressive strength of the carbon bodies. It has surprisingly been found that this requirement can be met even when the trains are relatively long. For this reason it is possible to provide a train in a length which has an electric resistance that is sufficient to ensure that the application of a reasonable supply voltage will result in a flow of currents having a permissible current value. The axial compressive stress produced in the train has also a desirable influence on the orientation of the grains in the carbon bodies as they are graphited.

If the train is moved in the graphitizing furnace through a preheating zone, graphitizing zone and a cooling zone in succession, the heat which is dissipated from the train in the cooling zone may desirably be used to preheat the train if the inert gas is caused to flow through the graphitizing furnace in a direction which is opposite to the feeding direction of the train and the inert gas is caused to by-pass the graphitizing zone and to deliver to the train in the preheating zone a part of the heat which has been absorbed by said inert gas from the train in the cooling zone. Because the inert gas is caused to by-pass the graphitizing zone, the heat treatment of the train in the graphitizing zone will not be adversely affected by the inert gas from the cooling zone and the inert gas is not withdrawn from the graphiting zone for heat exchange purposes.

Within the scope of the invention, particularly desirable heating conditions will be established if the inert gas which has been withdrawn from the preheating zone is purified and cooled and is subsequently recycled to the cooling zone of the graphitizing furnace. The residual heat content of the inert gas which has been used to preheat the train may be utilized as the inert gas is cooled and the recirculation of the inert gas will minimize the amount of inert gas which is required.

The process may be carried out by means of a known graphitizing furnace and an intermittent conveyor, which is provided with two gripping heads, which are respectively arranged in front of and behind the graphitizing furnace and operable to axially grip the train of carbon bodies between said gripping heads and are adjustable along the axis of the furnace to an extent which is at least as large as the length of one carbon body. The graphitizing furnace contains an inert gas atmosphere and comprises at least substantially gastight passages for the train and is provided at each of its entrance and exit ends with an auxiliary gripper, which comprises radially movable gripping jaws for radially gripping the train at that carbon body which at the beginning of a feeding step is in contact with the gripping head disposed at the exit end of the furnace and at that carbon body which at the end of a feeding step is in contact with the gripping head disposed at the entrance end of the furnace. The gripping jaws of the auxiliary grippers are operable to produce the required axial compressive stress in that portion of the train which is disposed in the graphitizing furnace and is not affected by the shortening and lengthening of the train and that axial compressive stress can be produced by said auxiliary grippers before at least one of the two gripping heads is retracted from the train. As a result, that portion of the train which is disposed between the two auxiliary grippers can continuously be gripped under the axial compressive stress which is sufficient to render the train self-supporting. This is essential for the desired feeding of the train through the graphitizing furnace. It will depend on the conditions encountered in each case whether the radially acting gripping jaws must be subjected to an axial pressure or whether said gripping jaws can merely maintain the axial compressive stress which has been produced by the gripping heads. If a radial gripping of the train between axially immovable auxiliary gripper is not sufficient for maintaining the required minimum axial compressive stress, the train may be gripped between one of the auxiliary grippers and the gripping head disposed at that end of the furnace which is opposite to said one auxiliary gripper because the shortening and lengthening of the train need not be effected at the same time but may be effected in succession.

Because the graphitizing furnace is filled with an inert gas atmosphere, the furnace must be provided with substantially gastight passages for receiving the train adjacent to the entrance and exit ends of the furnace. The seal required for such passage openings may consist of a sliding contact seal, which surrounds the train in sealing contact therewith although this will give rise to an undesirable sliding friction during the feeding of the train. In order to avoid a sliding friction between the seal and the train the furnace may be provided at each of its entrance and exit ends with a sleevelike closure, which is axially displaceable relative to the housing of the furnace by the length of a feeding step of the intermittent conveyor and said closure may have a passage opening for receiving the train and adjacent to said passage opening may be provided with a closure seal, which surrounds and is radially movable to contact the train. In that case the sleevelike closure can be moved together with the train during each feeding step and the train will not move in contact with such seal relative to such seal during a feeding step. When the closure seal has been disengaged from the train the closure can be returned to its initial position between consecutive feeding steps. The closure seal may be composed of a plurality of segments of a ring, which segments overlap each other in the peripheral direction of the ring and are pivoted on axes which are parallel to the train. The inside diameter of the annular closure seal can infinitely be adjusted in that the segments are pivotally moved, e.g., by an adjusting ring.

The housing of the furnace should remain gastightly sealed as the closure are returned to their initial positions. For that purpose the housing of the furnace may be provided adjacent to each of its entrance and exit ends with a housing seal, which surrounds and is radially movable to contact the train. Each closure seal and the adjacent housing seal are adapted to be moved to contact the train in alternation. Because said seals define lock chambers, a gastight passage for the train adjacent to the entrance and exit ends of the furnace will be provided during each feeding step and between consecutive feeding steps, and this is accomplished without the use of a sliding seal which cooperates with the train. It will be sufficient to provide a gastight joint between the housing of the furnace and the two housing seals provided at the two ends of said housing. Such gastight joints can be provided without difficulty because the sleevelike closures may be axially slidably mounted on the outside of the furnace housing.

In a graphitizing furnace containing a packing of carbon particles, current may be supplied to the train in the graphitizing furnace by electric terminal means comprising electrodes which extend radially to the train through the housing of the furnace in a plane which is normal to the axis of the train and those carbon particles of the packing which are disposed between said electrodes and the train will constitute an electrically conducting path. Such terminals means may also be used in a graphitizing furnace in accordance with the invention if the electrodes of the electric terminal means are disposed between partitions which extend transversely to the axis of the furnace and are formed each with a passage opening for receiving the train and a packing of carbon particles is disposed between said two partitions. Said packing, which is provided only in a restricted region, serves only for a supply of current. The inert gas atmosphere in the graphitizing furnace is not adversely affected by said locally provided packings of carbon particles. Because such electric terminal means define heat-treating zones and a flow of inert gas between adjacent heat-treating zones is generally undesirable, the provision of such partitions confining a packing of carbon particles will result in a desirable division of the graphitizing furnace into length sections.

The graphitizing furnace may contain two electric terminal means, which define a graphitizing zone and are spaced from the entrance and exit ends of the furnace so that said electric terminal means divide the interior of the graphitizing furnace into a preheating zone, a graphitizing zone and a cooling zone. That division may be utilized for a desirable heat transfer between the inert gas and the train if the cooling zone provided between the graphitizing zone and the exit end of the furnace is connected to the preheating zone provided between the entrance end of the furnace and the graphitizing zone by at least one line for conducting the inert gas so as to by-pass the graphitizing zone. In that the case the inert gas flowing oppositely to the feeding direction of the train will flow from the cooling zone to the preheating zone so that part of the heat absorbed by the inert gas from the train in the cooling zone can be delivered to the train in the preheating zone. The residual sensible heat of the inert gas may be recovered in a heat exchanger disposed outside the graphitizing furnace and the cooled inert gas may then be recycled to the cooling zone.

BRIEF DESCRIPTION OF THE DRAWING

FIG. 1 is a diagrammatic longitudinal sectional view showing an apparatus in accordance with the invention for graphitizing carbon bodies by the process in accordance with the invention.

FIG. 2 is an enlarged fragmentary longitudinal sectional view showing a portion of the graphitizing furnace of FIG. 1 adjacent to electrical terminal means.

FIG. 3 is a fragmentary longitudinal sectional view showing the entrance portion of the furnace with the closure in its position assumed immediately before a feeding step.

FIG. 4 is a view that is similar to FIG. 3 and shows the entrance portion of the furnace with the closure in its position assumed after a feeding step.

FIG. 5 is a sectional view taken on line V—V in FIG. 2 and

FIG. 6 is a sectional view taken on line VI—VI in FIG. 2.

DETAILED DESCRIPTION OF THE PREFERRED EMBODIMENT

The process in accordance with the invention will be explained more in detail with reference to the drawing.

The illustrated apparatus for graphitizing carbon bodies comprises a graphitizing furnace 1. An intermittent conveyor is provided, by which preburnt carbon bodies 3, which are forced together in end-to-end alignment to form a horizontal train 2, are moved through the furnace 1. The intermittent conveyor comprises two gripping heads 6, which are disposed outside the graphitizing furnace 1 adjacent to its entrance end 4 and its exit end 5, respectively. Fluid-operable cylinders, not shown, are provided, which are operable to force said gripping heads 6 against the train 2 and to apply a predetermined pressure to said train and to move said gripping heads 6 on the axis of the train 2 by an extent which defines the length of a feeding step while the application of pressure to the train is maintained. As a result, the train 2 which is gripped between the gripping heads 6 can be fed through the graphitizing furnace in feeding steps. After each feeding step a graphited carbon body 3 is removed from the train at the exit end 5 of the furnace and a new carbon body 3 which is to be graphitized is added to the train at the entrance end 4 of the furnace. The graphitizing furnace 1 comprises a furnace housing 7, which is provided with a heat-insulating lining 8 and contains an inert gas atmosphere. For this reason the train 2 must be moved through the furnace housing 7 while the train is self-supporting at least in large portions of its length. To that end the gripping heads 6 must subject the train 2 to an axial compressive stress which is sufficient to render the train self-supporting and that axial compressive stress must be maintained during each feeding step and when the train 2 is shortened and lengthened between consecutive feeding steps. For that purpose, two auxiliary grippers for radially gripping the train 2 are provided and comprise gripping jaws 9, which are radially operable by fluid-operable cylinders 10 into engagement with the train 2 to radially grip the latter. One of said auxiliary grippers is provided adjacent to that carbon body which at the beginning of a feeding step is in contact with the gripping head 6 disposed near the exit end of the furnace 1. The other of said auxiliary grippers is disposed adjacent to that carbon body which at the end of a feeding step is in contact with the gripping head 6 which is disposed adjacent to the entrance end of the furnace 1. After each feeding step the auxiliary grippers are operable to grip the train 2 with the exception of the graphitized carbon body which is to be removed and can maintain in the train an axial compressive stress that is sufficient to render the train self-supporting. The gripping head 6 disposed adjacent to the exit end 5 of the furnace can then be retracted from the train 2 and the graphitized carbon body can then be removed from the train 2. Moreover, the gripping head disposed adjacent to the entrance end 4 of the furnace may be retracted from the train 2 to an extent which is at least as large as the length of a carbon body so that the train 2 can be lengthened by the addition of a carbon body 3 adjacent to the entrance end 4 of the furnace. When the graphited carbon body has been removed from the train and a carbon body which is to be graphitized has been added to the train, the two gripping heads 6 can be moved into engagement with the train so as to apply the required pressure thereto and the gripping jaws 9 may then be disengaged from the train 2 so that the next feeding step can be performed. Because the times in which the train 2 is gripped by the gripping jaws 9, on the one hand, and by the gripping heads 6, on the other hand, overlap each other, the required axial compressive stress will always be maintained at least in that portion of the train which is disposed between the auxiliary grippers.

In the present embodiment a gastight passage for receiving the train 2 is provided adjacent to the entrance end 4 and the exit end 5 of the furnace by the provision of sleevelike closures 11, which are axially slidably mounted on the outside of the furnace housing 7 for a movement to an extent which corresponds to the length of a feeding step of the intermittent conveyor. Each of said closures 11 has a passage opening 12 for receiving the train 2 and adjacent to the opening 12 is provided with a closure seal 13, which surrounds and is radially movable into contact with the train 2, as is particularly apparent from FIGS. 3 and 4. Each of said closure seals 13 may be composed of a plurality of seal segments, which overlap each other in the peripheral direction and together form a ring. Because each seal segment is pivoted on an axis which is parallel to the axis of the train 2, the seal ring can easily be adjusted to match the diameter of the carbon bodies. To move the closure seal 13 into engagement with the train, the seal segments must be pivotally moved, e.g., by an adjusting ring. Such arrangements are known per se and for this reason are not shown.

Similar housing seals 14, which are movable into engagement with the train 2 are provided on the furnace housing 7 at its entrance and exit ends. Those seals 13 and 14 which are provided adjacent to the entrance end 4 of the furnace and adjacent to the exit end 5 of the furnace may be moved into engagement with the train 2 in alternation to form lock chambers. During each feeding step the closure seal 13 of each closure 11 will be in contact with the train and the closures 11 will be moved in unison with the train 2 whereas the housing seals 14 will be open. Before the closures 11 are returned to their initial positions the housing seals 14 are moved to contact the train 2 and the closure seals 13 are opened so that there will be no sliding friction between the train 2, on the one hand, and the seals 13 and 14, on the other hand.

Different heat-treating zones are defined by three electric terminal means 15, 16 and 17, which are spaced along the train 2. A heat-treating zone 18 is provided between the terminal means 16, which are arranged in the graphitizing furnace 1 at a distance from its entrance end 4, and the terminal means 15, which consist of an electrode, which is carried by the gripping head 6 adjacent to the entrance end of the furnace and contacts the adjacent end face of the train 2. A graphitizing zone 19 is provided between the terminal means 16 and the next succeeding terminal means 17. A cooling zone 20 is provided between the terminal means 17 and the exit end 5 of the furnace. The provision of said different heat-treating zones permits a desirable utilization of heat because the inert gas is caused to flow in the graphitizing furnace 1 in a direction that is opposite to the feeding direction of the train 2 from the cooling zone, which precedes the exit end 5 of the furnace, to the preheating zone 18 in a line 21 which by-passes the graphitizing zone 19 so that part of the heat which has been absorbed by the inert gas during the cooling of the train 2 can be delivered to the train 2 in the preheating zone 18. For a recovery of the residual heat remaining in the inert gas the latter can be withdrawn from the closure 11 provided near the entrance end and may then be purified in a filter 22 and subsequently be passed through a heat exchanger and be recycled in a line 23 to the cooling zone. It will be understood that the lines which are connected to the closures 11 must be movable with said closures as the latter are displaced and for this purpose must be adjustable in length.

The terminal means 16 and 17 which are provided within the interior of the furnace 1 must be able to supply current to the train 2 as it moves. For this purpose each terminal means 16 and 17 comprise two or more electrodes 24, which extend radially to the train through the furnace housing 7 in a plane which is normal to the axis of the furnace. The electrodes 24 of each terminal means 16 or 17 are disposed between two partitions 25, which extend transversely to the axis of the furnace and are formed each with a passage for receiving the train 2 and between them confine a bed 26 of carbon powder by which an electrically conductive path is established between the end face of each electrode 24 and the train 2. Any carbon powder which is entrained by the train 2 as it moves through the passage opening in the partition 25 which is nearer to the exit end of the furnace will be withdrawn from the furnace through a suitable duct 27. A feeding duct 28 is provided for adding carbon powder to the bed 26 in case of need. As is apparent from FIGS. 2, 5 and 6 the current-conducting components are electrically insulated and it will be sufficient to provide such insulation on the radially inner end portions of such components.

In order to ensure that the electrodes will be evenly spaced from the train 2, each of the terminal means 16, 17 may be preceded in the graphitizing furnace 1 by a roller 29 for supporting the train 2. The flow of electric current will result in a higher temperature rise of the furnace housing 7 adjacent to the terminal means 16 and 17. For this reason the furnace housing may be provided with a cooling jacket 30 at least in said regions.

To graphitize the carbon bodies 3 when they are forced together by the gripping heads 6 to form the train 2, said train is fed in steps through the graphitizing furnace 1 and is heated in different zones of that furnace. The initial position before a feeding step is shown in FIGS. 1 and 3. After each feeding step the gripping jaws 9 of the auxiliary grippers are forced against the train 2 so that the axial compressive stress which is required to render the train 2 self-supporting will be maintained even when the gripping heads 6 have been retracted from the train and a carbon body 3 can then be removed from the train 2 at the exit end of the furnace 1 and a new carbon body can be added to the train 2 at the entrance end of the furnace. When the train 2 has thus been shortened and lengthened, respectively, the gripping heads 6 are again applied to the end faces of the train 2 and are caused to apply the required pressure to the train 2. Thereafter the gripping jaws 9 can be disengaged from the train so that the gripping heads 6 can be operated to impart to the train 2 another feeding step in the graphitizing furnace after the electric current for heating the train has been turned on.

We claim:

1. In a process of graphitizing carbon bodies in a graphitizing furnace comprising a housing defining an interior between entrance and exit ends spaced apart along a horizontal axis, comprising the steps of
   (a) forming a horizontally extending train consisting of a series of said carbon bodies of equal length in end-to-end alignment,
   (b) forcing the carbon bodies in said end-to-end alignment against each other,
   (c) feeding the train of the carbon bodies forced against each other through said housing from said entrance end to said exit end in consecutive feeding steps of a length corresponding to the length of each carbon body,
   (d) causing electric current to flow through said train in said housing interior until said train has been heated to a graphitizing temperature along at least a part of the length of the train and the carbon bodies have been graphitized,
   (e) removing a graphitized carbon body from said train at said exit end and adding an additional carbon body to said train at the entrance end between consecutive ones of said feeding steps, and the improvement comprising the steps of
   (f) filling the housing interior with an inert gas, (g) gripping said train axially and subjecting the gripped train to an axial compressive stress which is sufficient to render said train self-supporting in the housing interior, and (h) maintaining said axial compressive pressure in said train between said consecutive feeding steps except in the graphitized carbon body being removed and the additional carbon body being added.

2. In the graphitizing process of claim 1, the further steps of (a) dividing the housing interior into a preheating zone adjacent the entrance end, a cooling zone adjacent the exit end, and a graphitizing zone between the preheating and cooling zones along said part of the length of the train, (b) causing the inert gas to flow countercurrently to said direction from the exit end to the entrance end, the inert gas absorbing heat from said train in the cooling zone, and (c) causing the inert gas which has absorbed heat to by-pass said graphitizing zone and to flow into said preheating zone to deliver the heat to said train in the preheating zone.

3. The graphitizing process of claim 2, comprising the further steps of (a) withdrawing inert gas from said preheating zone, (b) purifying the withdrawn inert gas, (c) cooling the purified inert gas, and (d) recycling the cooled, purified inert gas to the cooling zone.

4. An apparatus for graphitizing carbon bodies arranged in a horizontally extending train consisting of a series of carbon bodies of equal length in end-to-end alignment, which comprises (a) a graphitizing furnace comprising
  (1) a housing having entrance and exit ends spaced apart along a horizontal axis, (b) an inert gas contained in said housing, (c) an intermittently operable conveyor for feeding said train through the housing in a conveying direction from said entrance end to said exit end in consecutive feeding steps of a length corresponding to the length of the carbon bodies, the train having respective terminal carbon bodies at the entrance and exit ends and the conveyor comprising
  (1) two axially reciprocable gripping heads arranged respectively axially adjacent the entrance and exit ends, the gripping heads being operable to grip the train at respective ends thereof axially to exert thereon an axial compressive stress sufficient to render the train self-supporting in said housing, consecutive reciprocation of the gripping heads in the conveying direction causing the consecutive feeding steps, (d) auxiliary gripping means arranged respectively at the entrance and exit ends and operable for respectively radially gripping the terminal carbon body adjacent the gripping head at the exit end at the start of each consecutive feeding step and the terminal carbon body ajacent the gripping head at the entrance end at the end of each consecutive feeding step, and (e) electric terminal means operable to cause electric current to flow through said train in said housing until the train is heated to a graphitizing temperature at least along a part of the length of said train.

5. The graphitizing apparatus of claim 4, wherein said auxiliary gripping means comprise first and second auxiliary grippers respectively adjacent the entrance and exit ends of the housing and axially inwardly of the gripping heads, each gripper comprising a plurality of angularity spaced gripping jaws movable radially to grip the respective terminal carbon bodies.

6. The graphitizing apparatus of claim 4, further comprising a closure sleeve at each of said housing ends, the closure sleeve being axially movable relative to said housing to an extent corresponding to the length of each feeding step and defining a passage opening adapted to receive said train, and a closure seal surrounding the passage opening of the closure sleeve and radially movable into contact with the train received in the passage opening.

7. The graphitizing apparatus of claim 6, further comprising a respective housing seal surrounding the entrance and exit end of the housing and radially movable into contact with the train, the closure and housing seal at each housing end being radially movable into contact with the train in alternation.

8. The graphitizing apparatus of claim 4, further comprising axially spaced partitions in said housing, each partition defining a passage opening adapted to receive said train, and wherein the electric terminal means comprises a set of electrodes extending radially into said housing in a plane extending perpendicularly to the horizontal axis of the housing between a pair of said partitions and a bed of carbon particles contained in said housing between the pair of partitions and establishing an electrically conductive path between the electrodes and the train.

9. The graphitizing apparatus of claim 8, comprising two of said pairs of partitions axially spaced from each other, the pairs of partitions dividing the housing into a cooling zone adjacent the exit end, a preheating zone adjacent the entrance end and a graphitizing zone disposed between the cooling and preheating zones, and a by-pass line by-passing the graphitizing zone and connecting the cooling zone to the preheating zone for causing the inert gas to flow from the cooling zone into the preheating zone.

* * * * *